US009741982B2

(12) United States Patent
Takahashi et al.

(10) Patent No.: US 9,741,982 B2
(45) Date of Patent: Aug. 22, 2017

(54) BATTERY STORAGE STRUCTURE (71) Applicant: Brother Kogyo Kabushiki Kaisha, Nagoya-shi, Aichi-ken (JP)

(72) Inventors: Ryoya Takahashi, Gifu (JP); Takashi Goto, Nagoya (JP); Nobuo Kato, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 680 days.

(21) Appl. No.: 14/224,375

(22) Filed: Mar. 25, 2014

(65) Prior Publication Data

US 2014/0356677 A1   Dec. 4, 2014

(30) Foreign Application Priority Data

May 29, 2013   (JP) .................................. 2013-113414

(51) Int. Cl.
H01M 2/10   (2006.01)

(52) U.S. Cl.
CPC ...... H01M 2/1055 (2013.01); *H01M 2220/30* (2013.01)

(58) Field of Classification Search
CPC .............................. H01M 2/105; H01M 2/1055
See application file for complete search history.

(56) References Cited

U.S. PATENT DOCUMENTS 3,941,618 A * 3/1976 Mabuchi ............. H01M 2/1055
                                                        429/99
5,521,022 A * 5/1996 Petzl ..................... H01M 2/105
                                                        429/100
5,537,022 A * 7/1996 Huang .................. H02J 7/0042
                                                        320/107

(Continued)

FOREIGN PATENT DOCUMENTS

JP    S54-64927 U    5/1979
JP    S58-109158 U   7/1983

(Continued)

OTHER PUBLICATIONS

Dec. 20, 2016—(JP) Notification of Reasons for Rejection—App 2013-113414, Eng Tran.

*Primary Examiner* — Maria J Laios
*Assistant Examiner* — Robert S Carrico
(74) *Attorney, Agent, or Firm* — Banner & Witcoff, Ltd.

(57) ABSTRACT

A battery storage structure includes a battery storage portion, a battery terminal, a separate member, and an overhang portion. The battery storage portion includes a bottom surface portion and peripheral wall portion extending from the perimeter of the bottom surface portion in a direction that intersects with the bottom surface portion and forms a first opening. The battery terminal has a contact portion and is supported by the peripheral wall portion. The separate member is formed as a separate body from the battery storage portion. The overhang portion is provided on the separate member, is positioned on a first direction side with (Continued)

respect to the contact portion, and protrudes toward an inner side of the peripheral wall portion in a second direction. The first direction is a direction from the bottom surface portion toward the first opening. The second direction is a direction that intersects the first direction.

9 Claims, 10 Drawing Sheets

(56) References Cited

U.S. PATENT DOCUMENTS

| | | | |
|---|---|---|---|
| 6,120,932 A * | 9/2000 | Slipy | H01M 2/105 361/814 |
| 6,551,739 B1 * | 4/2003 | Chen | A47K 5/1217 429/96 |
| 2005/0056444 A1 * | 3/2005 | Murata | B41J 3/4075 174/50 |

FOREIGN PATENT DOCUMENTS

| | | |
|---|---|---|
| JP | S63-63889 U | 4/1988 |
| JP | 2008-270122 A | 11/2008 |
| WO | 2006006331 A1 | 1/2006 |

* cited by examiner

BATTERY STORAGE STRUCTURE

CROSS-REFERENCE TO RELATED APPLICATION

This application claims priority to Japanese Patent Application No. 2013-113414 filed on May 29, 2013, the disclosure of which is herein incorporated by reference in its entirety.

BACKGROUND

The present disclosure relates to a battery storage structure that is configured to store a battery.

A battery storage structure that is configured to store a battery is known. For example, a known battery storage structure includes a battery storage portion, a battery fixing portion and terminal portions. The battery storage portion and the battery fixing portion are integrally formed. The battery storage portion includes a box-shaped body that is configured to store the battery and an opening through which batteries can be inserted into the box-shaped body. The box-shaped body has a bottom surface that is configured to support the battery. The battery fixing portion is provided facing the bottom surface of the housing. When the battery is stored in the box-shaped body, the battery is disposed between the bottom surface and the battery fixing portion. The battery fixing portion comes into contact with the battery when the battery is stored in the box-shaped body, and also fixes the battery. Generally, in a case where the battery fixing portion is provided facing the bottom surface of the box-shaped body through plastic molding using a mold, the battery fixing portion is formed with the mold that is inserted from the side of the bottom surface of the housing. In such a case, a hole portion is therefore formed in the bottom surface of the box-shaped body, in order to arrange the mold.

In addition, a battery storage structure is known in which an overhang portion, which is opposed to the bottom surface of the battery storage portion, is formed in order to inhibit the positive electrode and the negative electrode of the battery from being connected in reverse. The overhang portion is provided further than the battery terminals in the direction in which the battery is inserted and removed. Generally, in a similar manner to forming the battery fixing portion, the overhang portion is formed with a mold that is inserted from the side of the bottom surface of the battery storage portion. A hole portion is therefore formed in the bottom surface, in order to arrange the mold.

SUMMARY

As described above, in a case where the hole portion is formed in the bottom surface of the battery storage portion in order to arrange the mold, if a liquid seeps into the battery storage portion, or if the battery leaks, the liquid may pass through the hole portion and may leak into portions other than the battery storage portion. It is therefore possible, for example, that the liquid can seep into the interior of a device having the battery storage portion and the liquid can come into contact with a component, such as a board etc., on which electrical circuits are mounted.

Various exemplary embodiments of the general principles described herein provide a battery storage structure that does not require a hole portion in order to form an overhang portion in a battery storage portion.

Various exemplary embodiments herein provide a battery storage structure that includes a battery storage portion, a battery terminal, a separate member, and an overhang portion. The battery storage portion is configured to store a battery. The battery storage portion includes a bottom surface portion and peripheral wall portion. The peripheral wall portion extends from the perimeter of the bottom surface portion in a direction that intersects with the bottom surface portion, and forms a first opening that is opposed to the bottom surface portion. The battery terminal is supported by the peripheral wall portion. The battery terminal has a contact portion that is configured to contact with an electrode of the battery when the battery is stored in the battery storage portion. The separate member is formed as a separate body from the battery storage portion. The overhang portion is provided on the separate member. The overhang portion is positioned on a first direction side with respect to the contact portion and protrudes toward an inner side of the peripheral wall portion in a second direction. The first direction is a direction from the bottom surface portion toward the first opening. The second direction is a direction that intersects the first direction.

BRIEF DESCRIPTION OF THE DRAWINGS

Embodiments will be described below in detail with reference to the accompanying drawings in which.

DETAILED DESCRIPTION

Figure 1:
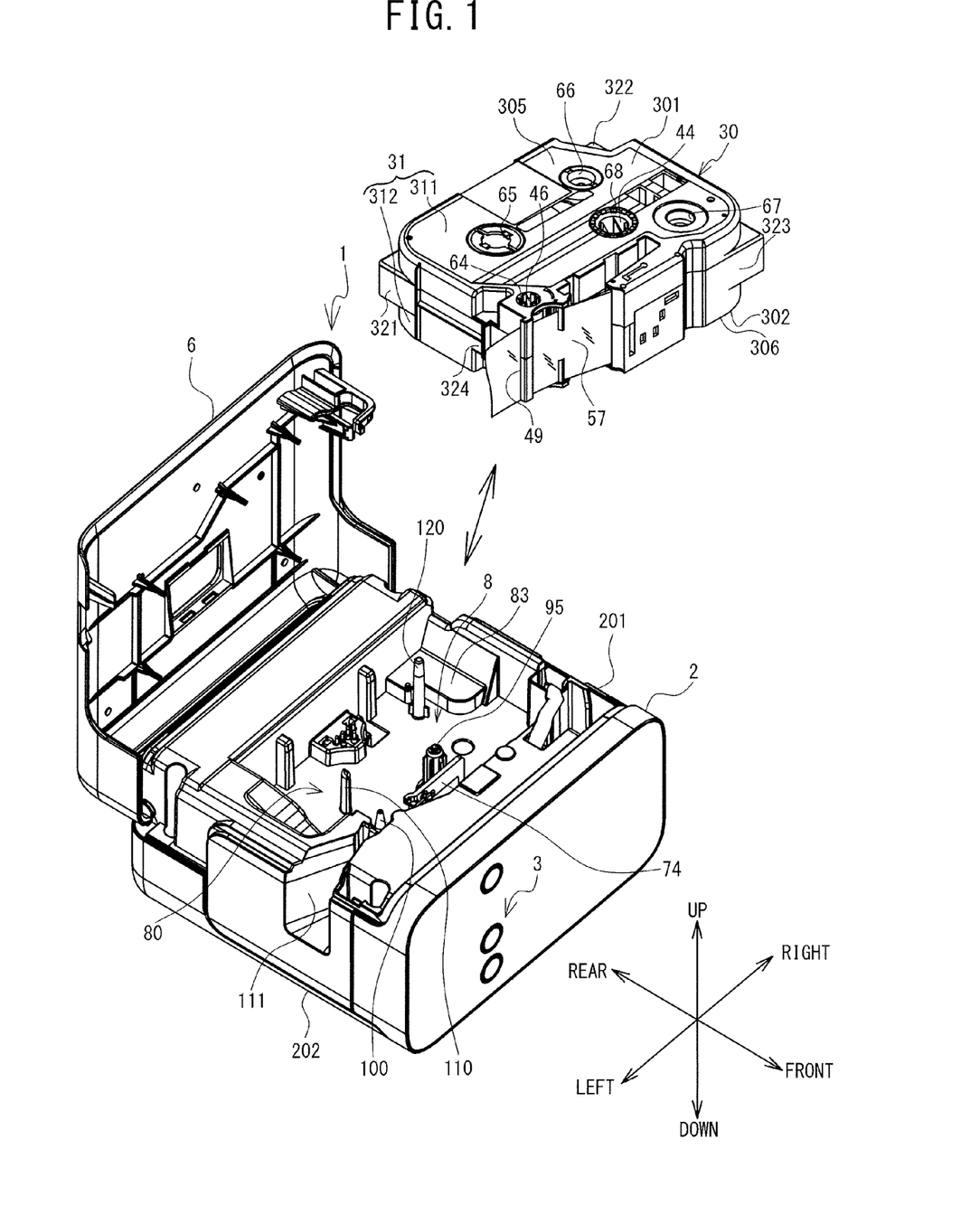
FIG. 1 is a perspective view of a tape printer and a tape cassette.

Hereinafter, an embodiment of the present disclosure will be explained with reference to the drawings. In the explanation of the present embodiment, the lower right side, the upper left side, the lower left side, the upper right side, the upper side and the lower side of FIG. 1 are, respectively, the front side, the rear side, the left side, the right side, the upper side and the lower side of a tape printer 1 and a tape cassette 30. Note that, the front-rear direction, the left-right direction and the up-down direction of the tape printer 1 and the tape cassette 30 are defined for explanation purposes in each case and the tape printer 1 and the tape cassette 30 are not always in a posture in which the upper side faces upward as shown in FIG. 1.

In the present embodiment, various tapes (a heat-sensitive paper tape, a print tape 57 to be described later, a double-sided adhesive tape, a tube tape or a film tape etc.) are each referred to as a tape. Types of the tape stored in the tape cassette 30 (a width of the tape, a print format, a color of the tape, a color of characters etc.) are each referred to as a type of tape.

Figure 2:
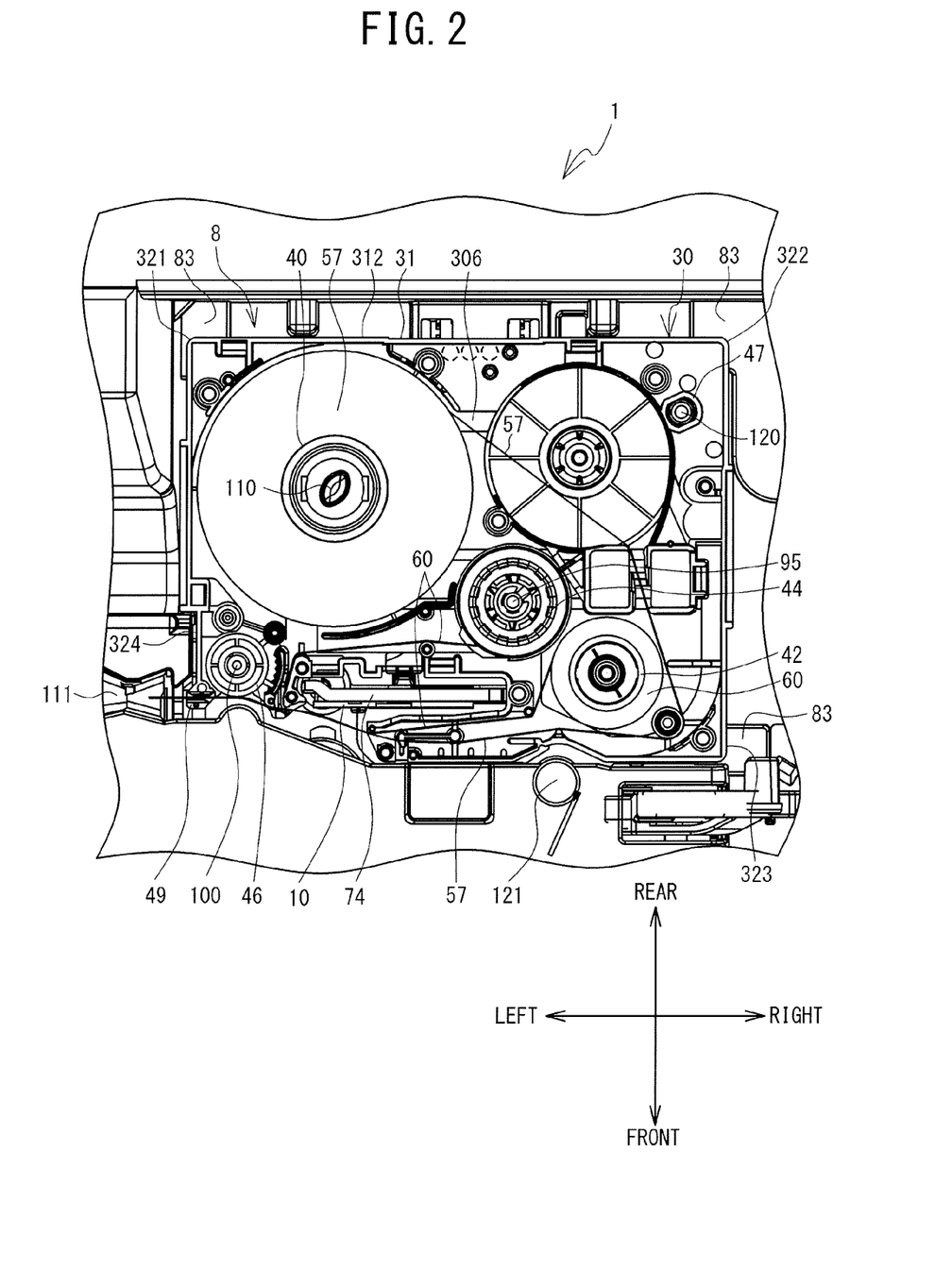
FIG. 2 is a plan view of a cassette housing portion in which the tape cassette is mounted.

The tape printer 1 will be explained. In FIG. 2, the tape cassette 30 mounted in a cassette housing portion 8 is a receptor type tape cassette and the tape cassette 30 is illustrated with a top case 311 removed. The tape printer 1 is a general-purpose tape printer in which can be mounted any one of various types of tape cassettes, such as a thermal type, a receptor type, a laminated type, a tube type etc. The thermal type tape cassette includes a heat-sensitive paper tape. The receptor type tape cassette includes the print tape 57 and an ink ribbon 60. The laminated type tape cassette includes a double-sided adhesive tape, a film tape and an ink ribbon. The tube type tape cassette includes a heat shrinkable tube tape and an ink ribbon.

Figure 3:
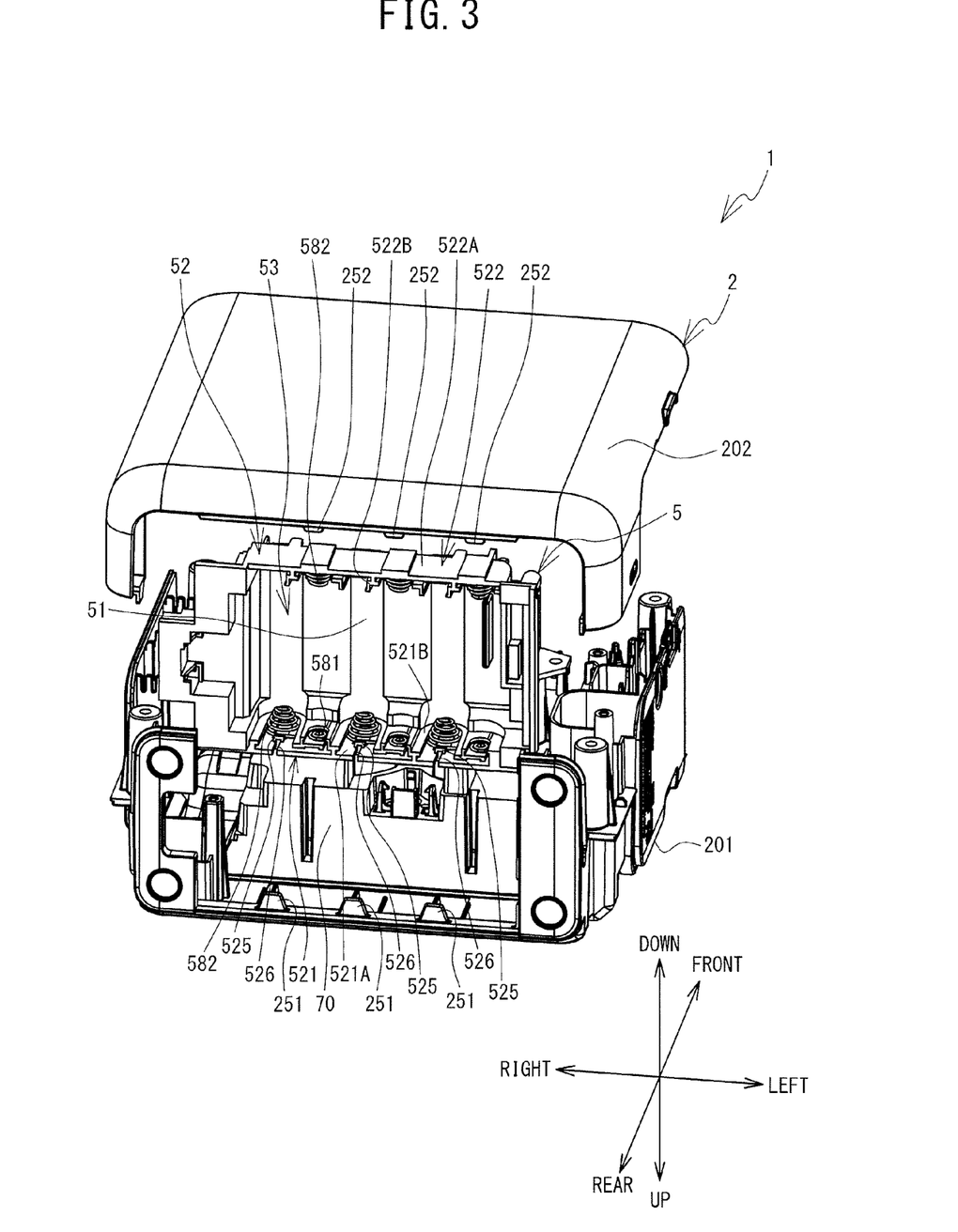
FIG. 3 is an exploded perspective view of a top cover, a bottom cover and a battery case.

As shown in FIG. 1 and FIG. 3, the tape printer 1 includes a substantially cuboid main body cover 2. The main body cover 2 includes a top cover 201 that forms a top portion of the main body cover 2, and a bottom cover 202 that forms a bottom portion of the main body cover 2. The top cover 201 forms a part of an exterior wall of a top portion and side surfaces of the tape printer 1 when a cassette cover 6 (to be described later) is open. The bottom cover 202 forms a part of the exterior wall of the bottom surface and the side surfaces of the tape printer 1. As shown in FIG. 1, three switches 3 to operate the tape printer 1, such as a power switch etc., are arranged on the front surface of the main body cover 2. A universal serial bus (USB) jack (not shown in the drawings) etc. is provided on the right surface of the tape printer 1. The tape printer 1 is configured to be connectable to a personal computer (not shown in the drawings; hereinafter referred to as a PC) via a USB cable (not shown in the drawings) etc. that is connected to the USB jack. The tape printer 1 is configured to perform printing of characters (letters, numerals, symbols etc.) on a tape, based on data of characters transmitted from the PC.

The cassette cover 6 is provided on the top surface side of the tape printer 1. The cassette cover 6 is configured to be opened and closed when the tape cassette 30 is replaced. The cassette cover 6 is a lid portion having a substantially rectangular shape in a plan view. The cassette cover 6 is rotatably supported at both the left and right ends at the top of the back surface of the main body cover 2. The cassette cover 6 is configured to be rotated between a closed position (not shown in the drawings) and an open position that is shown in FIG. 1. The cassette housing portion 8 is provided in the main body cover 2. The cassette housing portion 8 is an area that is configured to removably house the tape cassette 30. Wall portions that form the cassette housing portion 8 are a part of the top cover 201. When the cassette cover 6 is in the closed position, the cassette housing portion 8 is covered by the cassette cover 6. When the cassette cover 6 is in the open position, the cassette housing portion 8 is exposed. A discharge slit 111 is provided in the left side surface of the main body cover 2. A printed tape may be discharged from the cassette housing portion 8 via the discharge slit 111.

The structure of the main body cover 2 under the cassette cover 6 will be explained. As shown in FIG. 1, the cassette housing portion 8 includes a cavity 80 and corner support surfaces 83. The cavity 80 is a recessed portion that is formed such that it substantially corresponds to a shape of a bottom surface 302 of a cassette case 31. The corner support surfaces 83 are provided on the rear right portion, the rear left portion and the front right portion of the cassette housing portion 8 (refer to FIG. 2). Each of the corner support surfaces 83 is a flat surface that extends horizontally from the outer edge of the cavity 80.

As shown in FIG. 1 and FIG. 2, a head holder 74 is provided in a standing manner in a front portion of the cassette housing portion 8. The head holder 74 is formed of a single plate shaped member that extends in the left-right direction. A thermal head 10, which includes heating elements (not shown in the drawings), is provided on the front surface of the head holder 74. A ribbon take-up shaft 95 is provided in a standing manner to the rear of the head holder 74. The ribbon take-up shaft 95 is a shaft body that can be removably inserted in a ribbon take-up spool 44 of the tape cassette 30. A tape drive shaft 100 is provided in a standing manner to the left of the head holder 74. The tape drive shaft 100 is a shaft body that can be removably inserted in a tape drive roller 46 of the tape cassette 30. An auxiliary shaft 110 is provided in a standing manner to the rear and right of the tape drive shaft 100. The auxiliary shaft 110 is a shaft body that can be removably inserted in a first tape support hole 65 of the tape cassette 30. A guide shaft 120 is provided in a standing manner to the left of the corner support surface 83 of the rear right portion. The guide shaft 120 is a shaft body that can be removably inserted in a guide hole 47 of the tape cassette 30. A tape drive motor (not shown in the drawings), which is a stepping motor, is disposed below the cassette housing portion 8. The ribbon take-up shaft 95 and the tape drive shaft 100 are connected to the tape drive motor via a plurality of gears (not shown in the drawings), and may be rotated in accordance with the rotation of the tape drive motor. In this way, printing may be performed by the thermal head 10 while the tape inside the tape cassette 30 is being fed, and the printed tape may be discharged from the discharge slit 111.

Although not shown in the drawings, an arm-shaped platen holder that extends in the left-right direction is disposed to the front of the head holder 74. The platen holder is swingably supported, by a shaft support portion 121. A platen roller and a movable feed roller are rotatably supported by the left end portion of the platen holder. The platen roller may face the thermal head 10. The platen roller can come into contact with and be separated from the thermal head 10. The movable feed roller may face the tape drive roller 46 into which the tape drive shaft 100 is inserted. The movable feed roller can come into contact with and be separated from the tape drive roller 46. When the cassette cover 6 is closed, the platen holder moves toward a print position. The print position is a position in which the platen holder is close to the cassette housing portion 8. More specifically, when the receptor type tape cassette 30 is mounted in the cassette housing portion 8, the platen roller presses the thermal head 10 via the print tape 57 and the ink ribbon 60. At the same time, the movable feed roller presses the tape drive roller 46 via the print tape 57. In this manner, when the platen holder is in the print position, the tape printer 1 can perform printing using the tape cassette 30 that is mounted in the cassette housing portion 8. A cutting mechanism (not shown in the drawings) is provided to the right of the discharge slit 111. The cutting mechanism is configured to cut the printed tape at a specified position.

As shown in FIG. 3, a battery case 5 is disposed in a rear portion of the tape printer 1. The battery case 5 is sandwiched and held between the top cover 201 and the bottom cover 202. The battery case 5, the top cover 201 and the bottom cover 202 are all made of plastic, and are each formed by injection molding using a mold. The battery case 5 is configured to house six batteries 89 (refer to FIG. 4). The battery case 5 and the structure around the battery case 5 will be explained in more detail later.

The tape cassette 30 will be explained with reference to FIG. 1 and FIG. 2. The tape cassette 30 may be assembled as any one of the above-described thermal type, receptor type, laminated type or tube type etc. by changing as appropriate the type of tape housed inside the cassette case 31, by the presence or absence of an ink ribbon etc. In FIG. 2, the tape cassette 30 of the receptor type is illustrated as an example.

As shown in FIG. 1, the tape cassette 30 includes the cassette case 31 that is a housing. As a whole, the cassette case 31 has a substantially cuboid shape (box shape) having rounded corners in a plan view. The cassette case 31 includes the top case 311 and a bottom case 312. The bottom case 312 includes a bottom plate 306 that forms the bottom surface 302 of the cassette case 31. The top case 311 includes a top plate 305 that forms the top surface 301 of the cassette case 31. The top case 311 is fixed to the top portion of the bottom case 312.

Irrespective of the type of the tape cassette 30, the cassette case 31 has four first to fourth corner portions 321 to 324 that are formed having the same width (the length in the up-down direction is the same). In the following explanation, the corner portion to the rear left is referred to as the first corner portion 321, the corner portion to the rear right is referred to as the second corner portion 322, the corner portion to the front right is referred to as the third corner portion 323 and the corner portion to the front left is referred to as the fourth corner portion 324. Each of the first to third corner portions 321 to 323 protrudes outwards from the side surfaces of the cassette case 31 to form a right angle in the plan view. As the corner of the fourth corner portion 324 is provided with a discharge guide portion 49 that is configured to guide the tape being discharged from the tape cassette 30, the fourth corner portion 324 does not form a right angle. The bottom surfaces of the first to third corner portions 321 to 323 are members that are supported by ribs (not shown in the drawings) disposed on the corner support surfaces 83 when the tape cassette 30 is mounted in the cassette housing portion 8.

Four support holes 65 to 68, which are configured to rotatably support various spools that are mounted inside the cassette case 31, are provided in the cassette case 31. In the following explanation, holes that are formed in the rear portion on the left side, in the rear portion on the right side and in the front portion on the right side of the cassette case 31 are respectively referred to as a first tape support hole 65, a second tape support hole 66 and a ribbon support hole 67. A hole that is formed between the first tape support hole 65 and the ribbon support hole 67 in the plan view is referred to as the take-up spool support hole 68.

The first tape support hole 65 rotatably supports a first tape spool 40 (refer to FIG. 2). The ribbon support hole 67 rotatably supports a ribbon spool 42 (refer to FIG. 2). The take-up spool support hole 68 rotatably supports the ribbon take-up spool 44. As shown in FIG. 2, when the tape cassette 30 is the receptor type, the print tape 57 is wound on the first tape spool 40. The print tape 57 is pulled out from the first tape spool 40 and is guided toward the discharge slit 111. The ink ribbon 60 is wound on the ribbon spool 42. The ribbon take-up spool 44 takes up the ink ribbon 60 that has been used for printing. Although not shown in the drawings, in a case where the cassette case 31 is used for the laminated type, for example, the second tape support hole 66 rotatably supports a second tape spool on which the film tape that is the print medium is wound.

Figure 4:
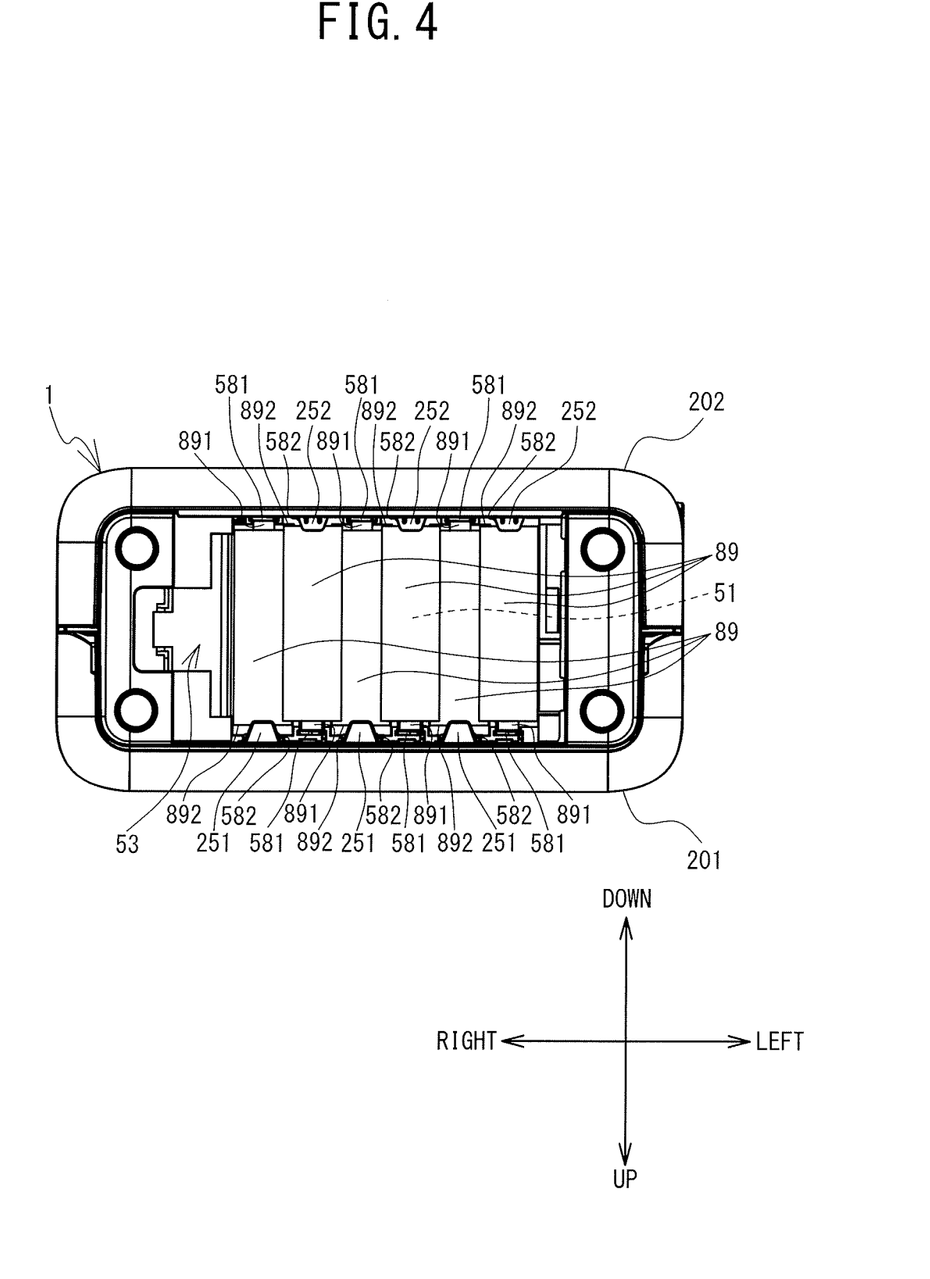
FIG. 4 is a rear view of the tape printer with batteries inserted.

Hereinafter, the battery case 5 will be explained in detail with reference to FIG. 3 to FIG. 8. Note that, in FIG. 5, in order to illustrate the shapes of positive electrode terminals 581 and negative electrode terminals 582, the battery case 5 is shown in a simplified manner. As shown in FIG. 3, the battery case 5 includes a battery mounting surface 51 and a peripheral wall portion 52, and is formed in a recessed shape that is recessed toward the front. The battery mounting surface 51 is a rectangular shaped surface that is longer in the left-right direction and that forms a bottom surface (the rear surface of the portion that is recessed to the front) of the battery case 5 that has the recessed shape. As shown in FIG. 4, in a state in which the six batteries 89 are mounted in the battery case 5, the batteries 89 are aligned in the left-right direction, and disposed in a zig-zag manner in the front-rear direction. As shown in FIG. 3, the battery mounting surface 51 has concave and convex indents in the front-rear direction that correspond to the shapes of the batteries 89 to be mounted. The peripheral wall portion 52 is provided around the perimeter of the battery mounting surface 51 and extends toward the rear. The rear end portion of the peripheral wall portion 52 forms an opening 53 that is opposed to the battery mounting surface 51.

The opening 53 may be usually covered by a battery cover that is not shown in the drawings. When the battery cover is removed, the battery case 5 is exposed to the outside of the tape printer 1. Note that the battery cover may be supported by the left and right ends of the battery case 5 such that the battery cover can be removably attached.

The peripheral wall portion 52 supports the positive electrode terminals 581 and the negative electrode terminals 582. A positive electrode 891 (refer to FIG. 4) and a negative electrode 892 (refer to FIG. 4) of each of the batteries 89 that are housed in the battery case 5 can come into contact with the positive electrode terminal 581 and the negative electrode terminal 582, respectively. Each of the positive electrode terminals 581 is formed in a flat spiral shape in the up-down direction. Each of the negative electrode terminals 582 protrudes in a spiral shape to the inside of the battery case 5. On each of the negative electrode terminals 582, a portion that is configured to come into contact with the negative electrode 892 of the battery 89 is referred to as a contact portion 583 (refer to FIG. 5). In the present embodiment, the contact portion 583 is a portion that includes the leading end of the negative electrode terminal 582 that protrudes to the inside of the battery case 5.

Figure 5:
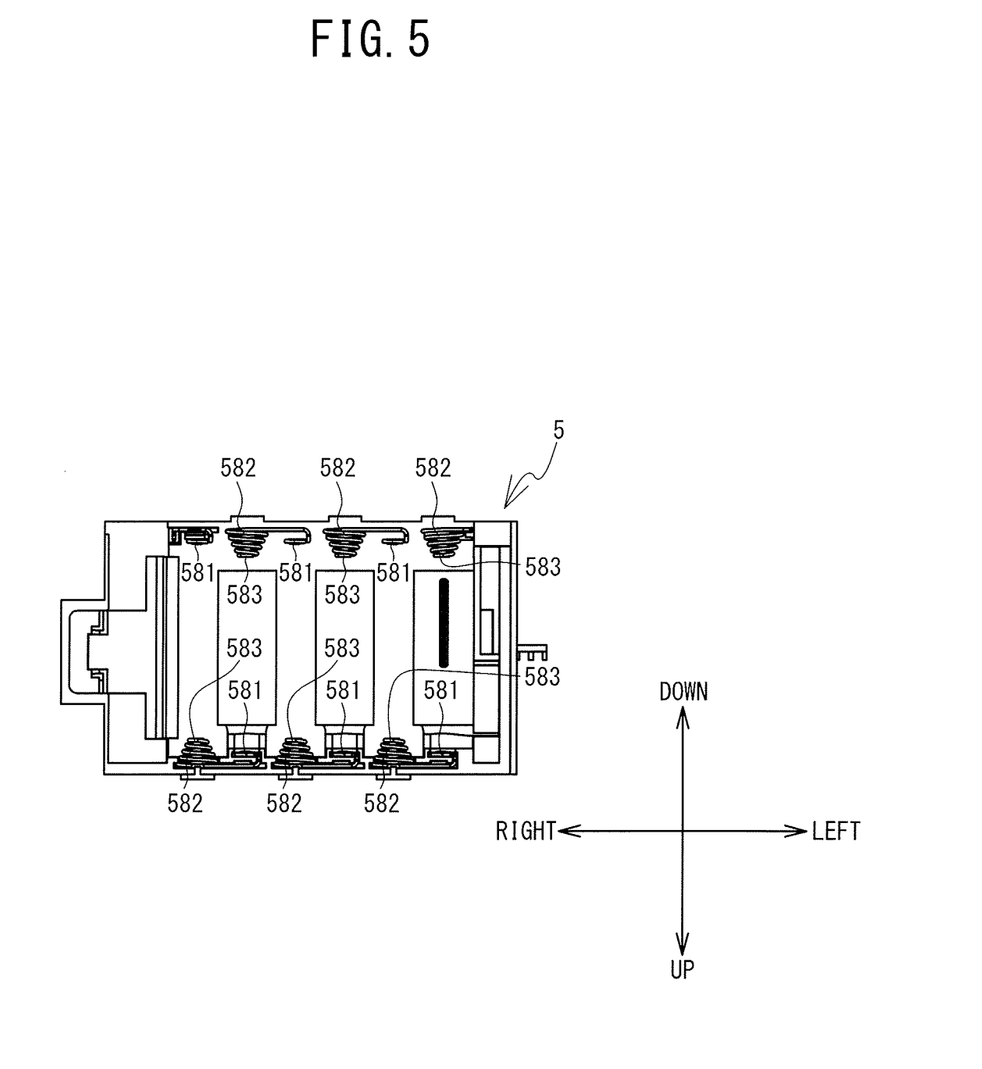
FIG. 5 is a rear view showing a simplified battery case.

As shown in FIG. 3 to FIG. 5, the battery case 5 includes six pairs of terminals. Each of the six pairs of terminals includes the positive electrode terminal 581 and the negative electrode terminal 582 that are provided on the inside of the peripheral wall portion 52 such that the positive electrode terminal 581 and the negative electrode terminal 582 are opposed to each other in the up-down direction. More specifically, the negative electrode terminal 582, the positive electrode terminal 581, the negative electrode terminal 582, the positive electrode terminal 581, the negative electrode terminal 582 and the positive electrode terminal 581 are disposed in that order from the right side to the left on a wall portion 521 (refer to FIG. 3) on the top side of the peripheral wall portion 52. A position of a center, in the front-rear direction, of each of the positive electrode terminals 581 (the center when seen from the bottom side) is further to the rear than a position of a center, in the front-rear direction, of each of the negative electrode terminals 582. As shown in FIG. 5, of the three positive electrode terminals 581 and the three negative electrode terminals 582 on the top side, the positive electrode terminal 581 and the negative electrode terminal 582 on the left side are mutually connected. The positive electrode terminal 581 and negative electrode terminal 582 in the center are mutually connected. The positive electrode terminal 581 and the negative electrode terminal 582 on the right side are mutually connected.

As shown in FIG. 3, the wall portion 521 includes a top end wall 521A and a support portion 521B. The top wall portion 521A is a wall portion that forms the top end of the wall portion 521, and extends in the left-right direction. The support portion 521B extends downward from the top end wall 521A, and a bottom end portion of the support portion 521B extends toward the positive electrode terminals 581 and the negative electrode terminals 582. Each of the left and right end portions and the front end portions of the three positive electrode terminals 581 and the three negative electrode terminals 582 are supported in a gap between the bottom end portion of the support portion 521B and the top end wall 521A.

Figure 6:
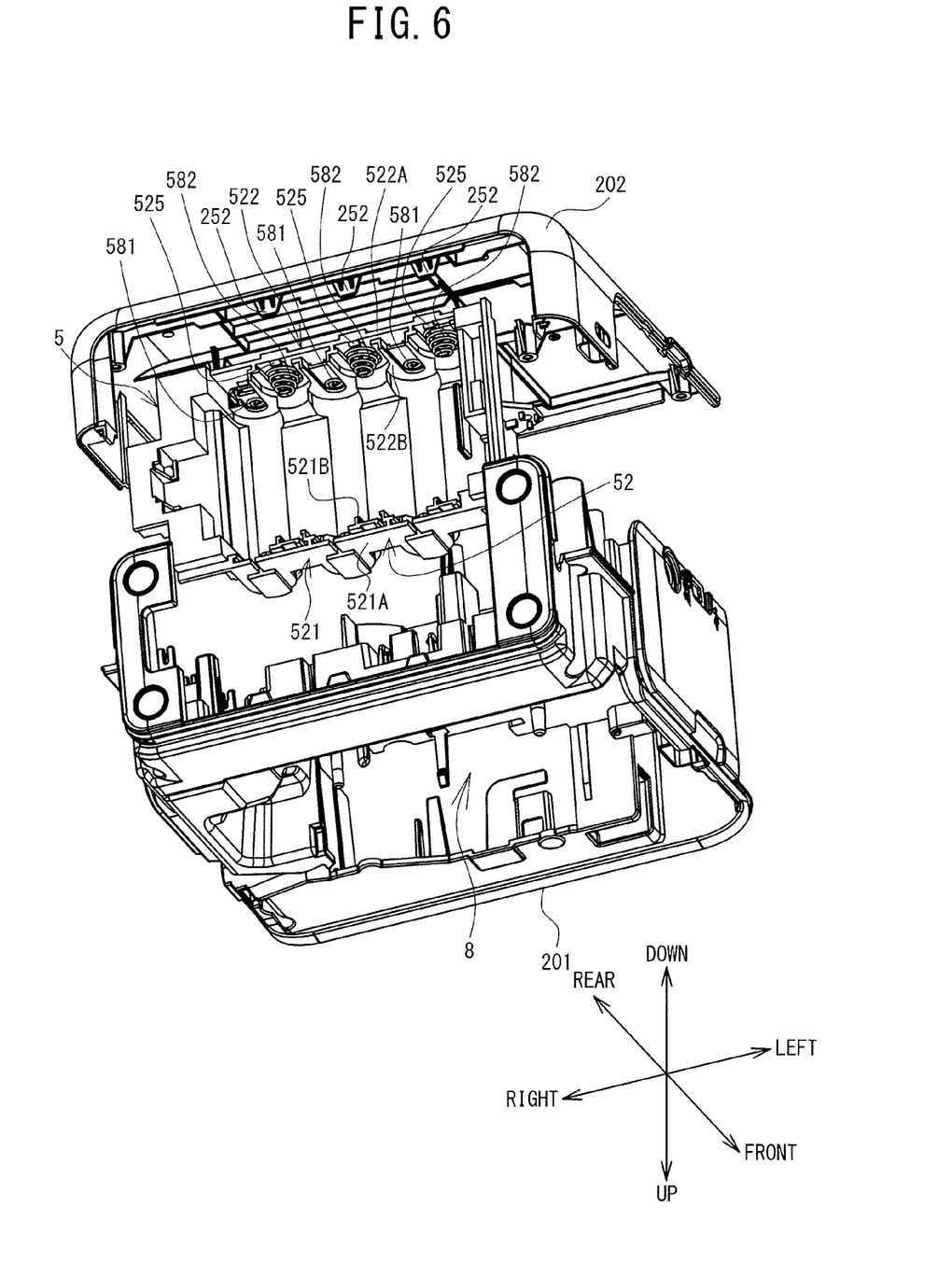
FIG. 6 is an exploded perspective view of the top cover, the bottom cover and the battery case.

As shown in FIG. 6, three of the positive electrode terminals 581 that are opposed to the three negative electrode terminals 582 on the side of the wall portion 521, and three of the negative electrode terminals 582 that are opposed to the three positive electrode terminals 581 on the side of the wall portion 521 are disposed on a wall portion 522 that forms the bottom side of the peripheral wall portion 52. The position of the center, in the front-rear direction, of each of the negative electrode terminals 582 (the center when seen from the top side) is further to the rear than the position of the center, in the front-rear direction, of each of the positive electrode terminals 581.

The wall portion 522 includes a bottom end wall 522A and a support portion 522B. The bottom end wall 522A is a wall portion that forms the bottom end of the wall portion 522 and extends in the left-right direction. The support portion 522B extends upward from the bottom end wall 522A, and the top end portion of the support portion 522B extends toward the positive electrode terminals 581 and the negative electrode terminals 582. Each of the left and right end portions and the front end portions of the three positive electrode terminals 581 and the three negative electrode terminals 582 are supported in a gap between the top end portion of the support portion 522B and the bottom end wall 522A.

Figure 8:
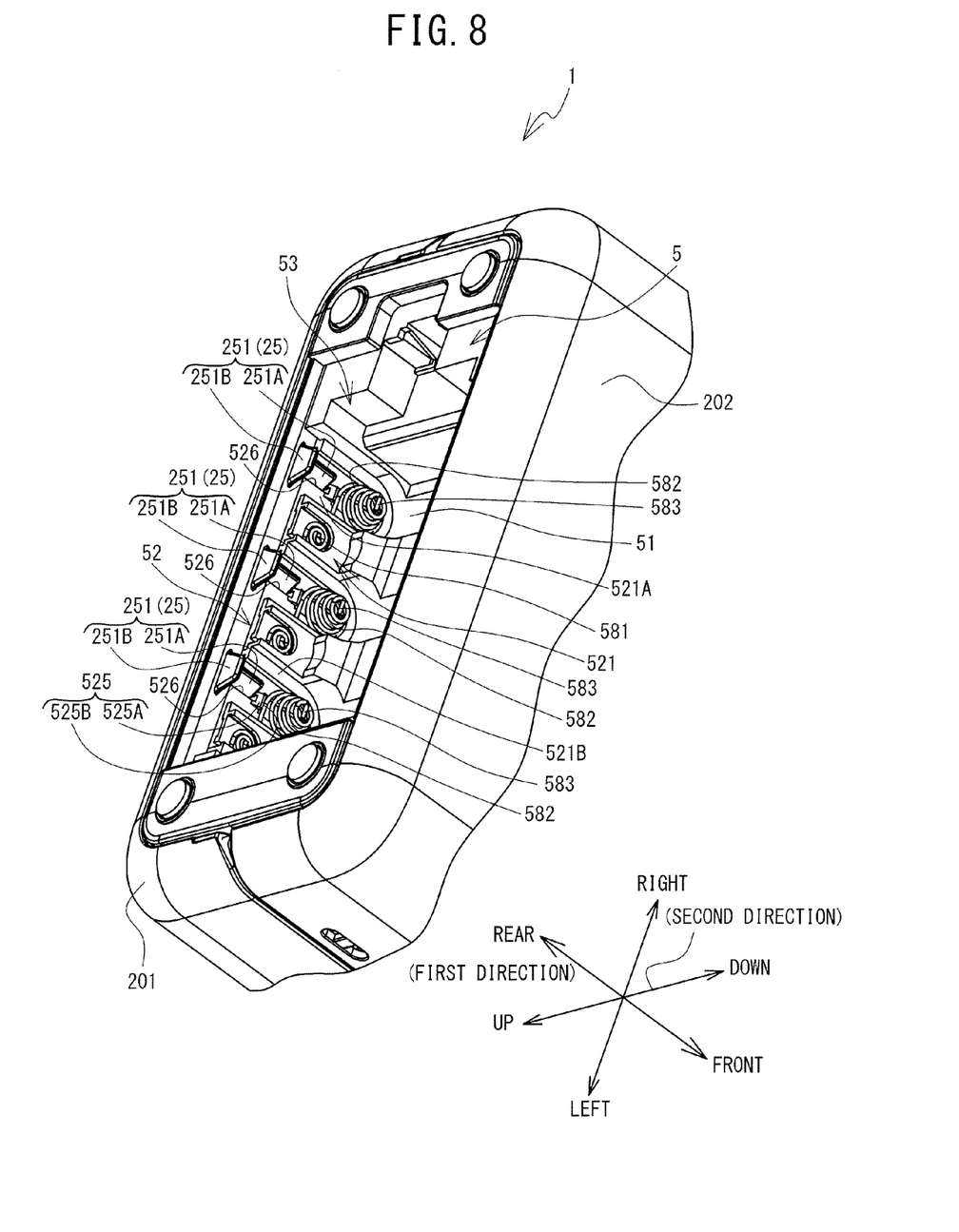
FIG. 8 is a perspective view of a structure surrounding the battery case.

As shown in FIG. 3 and FIG. 6, convex regulating portions 525 that protrude toward the inner side are provided on a surface on the inside of the battery case 5, on the top end wall 521A and the bottom end wall 522A. The regulating portions 525 are disposed to the rear of the negative electrode terminals 582. As shown in FIG. 8, the regulating portion 525 includes an inclined surface 525A that protrudes to the inside of the battery case 5 more and more toward the front side of the peripheral wall portion 52, and a wall surface 525B that extends in an outward direction of the battery case 5 from the front end portion of the inclined surface 525A. Expressed differently, the inclined surface 525A inclines in a direction in which the inclined surface 525A becomes separated, toward the side of the battery mounting surface 51, from the top end wall 521A or the bottom end wall 522A. The wall surface 525B extends as far as the top end wall 521A or the bottom end wall 522A from the end portion of the inclined surface 525A on the side of the battery mounting surface 51. At the time of manufacture of the tape printer 1, when the negative electrode terminal 582 is mounted in the battery case 5, the negative electrode terminal 582 is inserted from the rear side of the battery case 5 toward the front, while the right and left ends of the negative electrode terminal 582 is being supported between the support portion 521B and the wall 521A or between the support portion 522B and the wall 522A. The negative electrode terminal 582 flexes due to elasticity and goes up along the inclined surface 525A of the regulating portion 525. When the negative electrode terminal 582 passes the inclined surface 525A, the flexure of the negative electrode terminal 582 is released and the rear end portion of the negative electrode terminal 582 comes into contact with the wall surface 525B of the regulating portion 525. As a result, the negative electrode terminal 582 is sandwiched between the wall surface 525B and the support portion 521B or the support portion 522B, and its movement in the front-rear direction is regulated.

As shown in FIG. 3, three slits 526 are provided in the top end wall 521A. The slits 526 are openings that penetrate through the top end wall 521A in the up-down direction and extend in the front-rear direction toward the regulating portions 525 from the rear end of the top end wall 521A. The rear end portion of each of the regulating portions 525 on the side of the top end wall 521A is cut out toward the front by each of the slits 526 being arranged in this manner.

Hereinafter, a first overhang portion 251 and a second overhang portion 252 will be explained with reference to FIG. 3 and FIG. 6 to FIG. 9. In the following explanation, the direction from the battery mounting surface 51 toward the opening 53 (the rearward direction in the present embodiment) is sometimes referred to as a "first direction" and the up-down direction that is orthogonal to the first directions is sometimes referred to as a "second direction." Further, when the first overhang portion 251 and the second overhang portion 252 are collectively referred to, they are sometimes referred to as "overhang portions 25". When one of the first overhang portion 251 and the second overhang portion 252 is referred to without being particularly distinguished, it is sometimes referred to as an "overhang portion 25".

Figure 7:
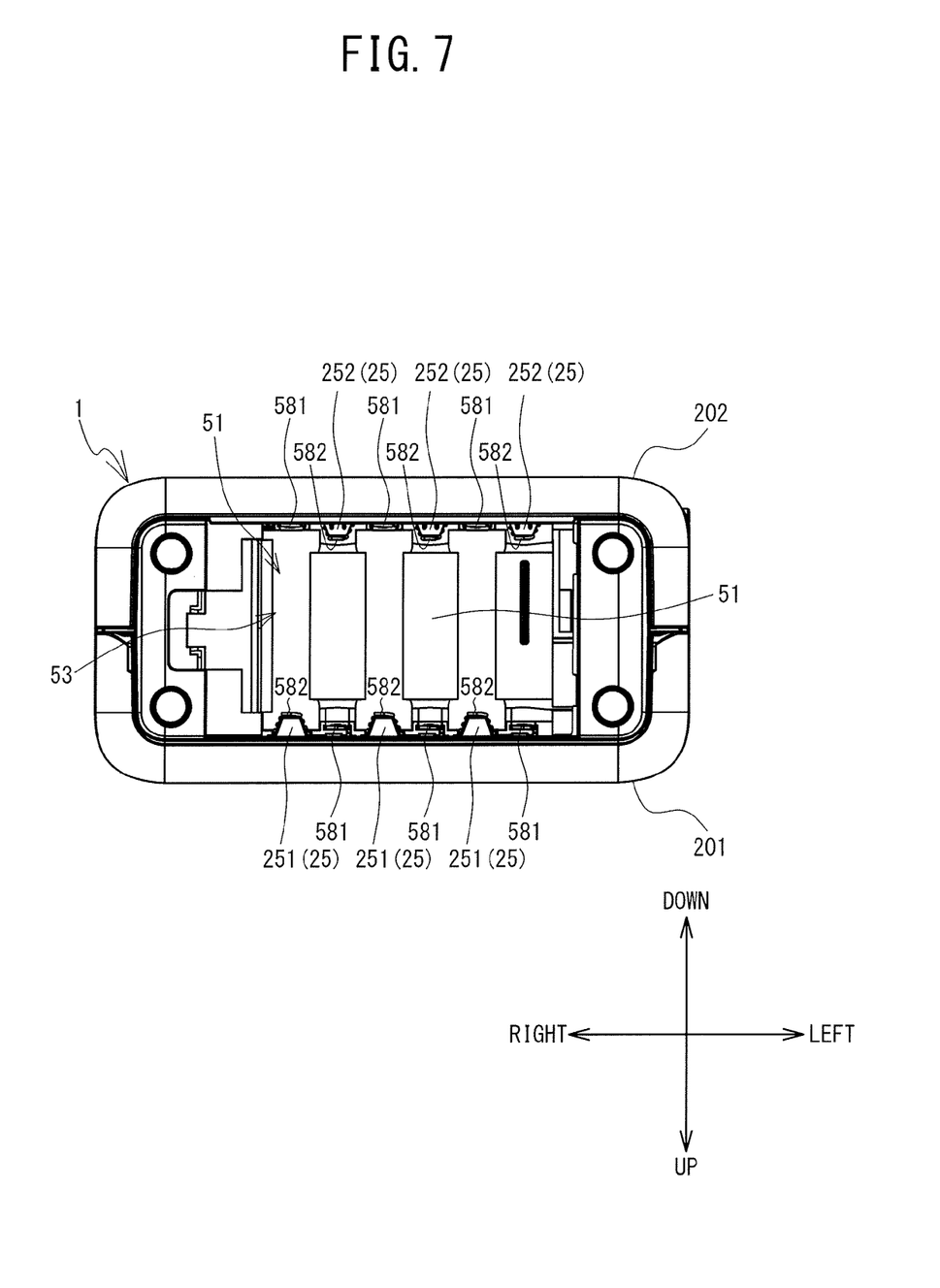
FIG. 7 is a rear view of the tape printer.
Figure 9:
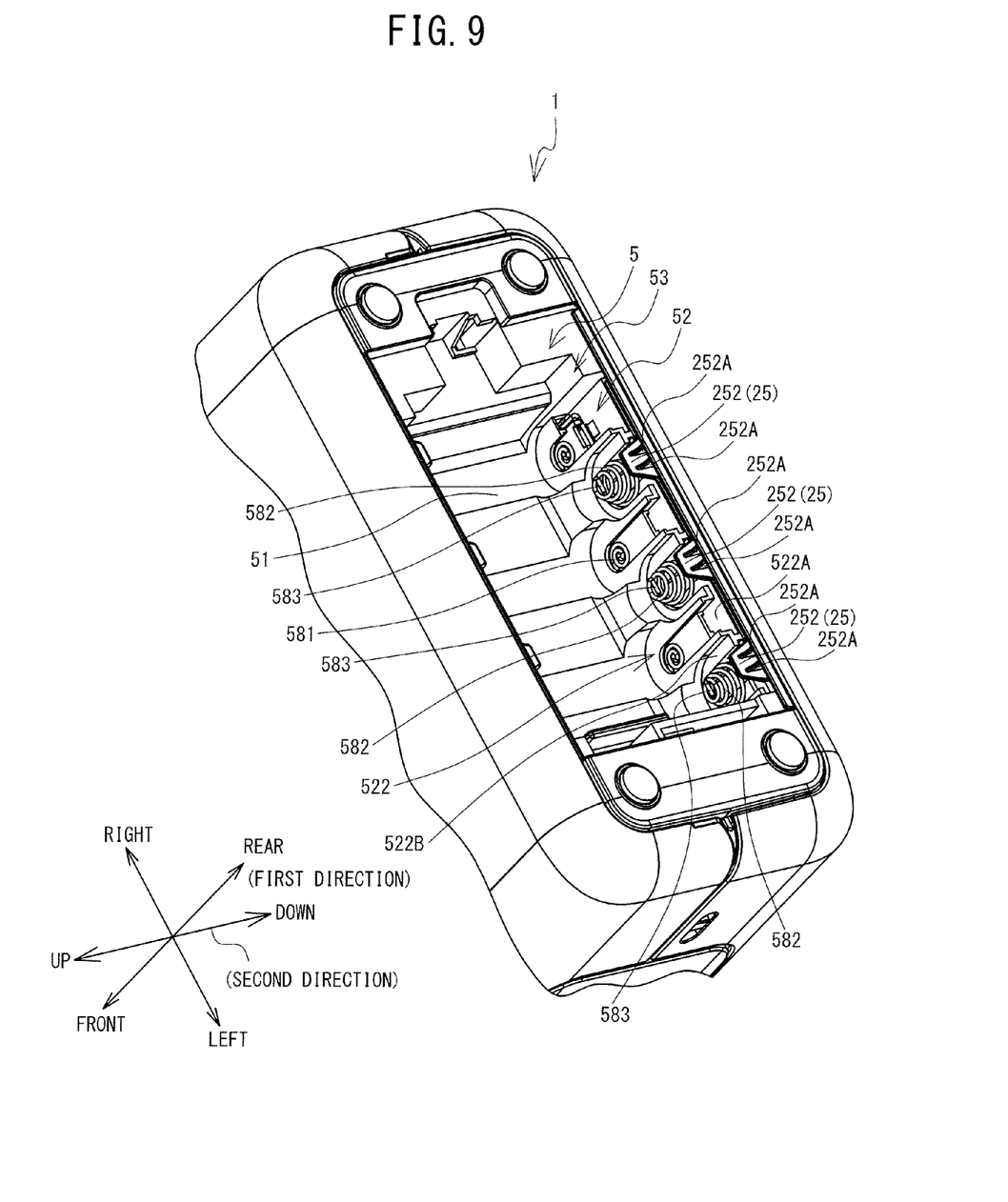
FIG. 9 is another perspective view of the structure surrounding the battery case.

As shown in FIG. 8 and FIG. 9, the first overhang portion 251 or the second overhang portion 252 is provided on the first direction side with respect to each of the contact portions 583 of the negative electrode terminals 582. The first overhang portion 251 is an overhang portion that is provided on the first direction side of each of the negative electrode terminals 582 of the top end wall 521A. The second overhang portion 252 is an overhang portion that is provided on the first direction side of each of the negative electrode terminals 582 of the bottom end wall 522A. As shown in FIG. 3, each of the first overhang portions 251 is provided on the rear end portion of the top cover 201. As shown in FIG. 6, each of the second overhang portions 252 is provided on the rear end portion of the bottom cover 202. As shown in FIG. 7 and FIG. 8, each of the first overhang portion 251 and the second overhang portion 252 protrudes to the inner side of the peripheral wall portion 52 in the second direction.

As shown in FIG. 8, each of the first overhang portions 251 includes a first wall portion 251A that extends in the first direction and a second wall portion 251B that is orthogonal to the first wall portion 251A and extends in the left-right direction. Each of the first wall portions 251A is inserted into the slit 526 that opens in the second direction and protrudes to the inner side of the peripheral wall portion 52. As shown in FIG. 7, the second wall portion 251B has a trapezoidal shape in a rear view and the width of the bottom end portion of the second wall portion 251B in the left-right direction is shorter than the width of the top end portion of the second wall portion 251B in the left-right direction. Each of the second overhang portions 252 is positioned on the rear side of the peripheral wall portion 52 and protrudes to the inner side of the peripheral wall portion 52. As shown in FIG. 7 and FIG. 9, each of the second overhang portions 252 has a trapezoidal shape in a rear view, and the width of the top end portion of the second overhang portion 252 in the left-right direction is shorter than the width of the bottom end portion of the second overhang portion 252 in the left-right direction. On the rear surface of the second overhang portion 252, two ribs 252A are provided, extending in a direction that is orthogonal to the rear surface. The ribs 252A extend upward from the bottom end wall 522A, and their height gradually decreases the further upward they extend. In comparison with a case in which the ribs 252A are not provided, providing the ribs 252A may increase the strength of the second overhang portion 252.

As described above, in the present embodiment, as shown in FIG. 7, each of the first overhang portions 251 and the second overhang portions 252 is positioned to the rear of each of the negative electrode terminals 582 (on the front face side in FIG. 7). Thus, if the battery 89 is mounted in the battery case 5 in a state in which the positive electrode 891 and the negative electrode 892 of the battery 89 are reversed, the rear surfaces of the first overhang portion 251 and the second overhang portion 252 (the surface on the front face side in FIG. 7) come into contact with the battery 89 and can thus inhibit the battery 89 from being connected in the reverse state. In addition, the first overhang portion 251 and the second overhang portion 252 inhibit the battery 89 from pushing the negative electrode terminal 582 from the rear, and thus it is possible to inhibit the negative electrode terminal 582 from deforming toward the front.

Furthermore, as shown in FIG. 3, the first cover 201 that has the first overhang portions 251 and the second cover 202 that has the second overhang portions 252 are formed as separate bodies from the battery case 5. The battery case 5 can therefore be formed using a mold that is different to a mold to form the first overhang portions 251 and the second overhang portions 252. As a result, it is possible to avoid forming the hole portions in the battery mounting surface 51 that forms the bottom surface of the battery case 5 in order to allow the arrangement of the mold to form the first overhang portions 251 and the second overhang portions 252. Accordingly, if a liquid seeps inside the battery case 5, or if the battery 89 leaks, it is possible to inhibit the liquid from passing through the hole portions that are used to form the first overhang portions 251 and the second overhang portions 252 and leaking into parts other than the battery case 5.

Because the regulating portions 525 are provided on the battery case 5 and hole portions may be formed in the battery mounting surface 51 in order to arrange a mold for forming the wall surfaces 525B of the regulating portions 525. However, the hole portion that is used to form each of the regulating portions 525 is smaller than the hole portion that is used to form each of the first overhang portion 251 and the second overhang portion 252. Therefore, compared to a case in which the hole portions are formed in order to form the first overhang portions 251 and the second overhang portions 252, it is possible to reduce the possibility that liquid will leak into parts other than the battery case 5.

The top cover 201 on which the first overhang portions 251 are formed functions as the cassette housing portion 8 and also functions to form the exterior wall of the tape printer 1. The bottom cover 202 on which the second overhang portions 252 are formed functions to form the exterior wall of the tape printer 1. In other words, the overhang portions 25 are formed on the top cover 201 and the bottom cover 202 that have functions separate from the function relating to the storage of the batteries 89. As a result, in comparison to a case in which the first overhang portions 251, the cassette housing portion 8 and the exterior wall of the tape printer 1 are formed separately, it is possible to reduce the manufacturing costs of the tape printer 1. Further, in comparison to a case in which the second overhang portions 252 and the exterior wall of the tape printer 1 are formed separately, it is possible to reduce the manufacturing costs of the tape printer 1.

As described above, the regulating portions 525 are formed on the battery case 5. When the wall surface 525B (refer to FIG. 8) is formed on the regulating portion 525, it is possible that a hole portion is formed in a portion of the battery mounting surface 51 that is located to the front of the wall surface 525B in order to arrange a mold to form the wall surface 525B. If an overhang portion (hereinafter referred to as an "other overhang portion") that is different to the overhang portion 25 is formed integrally with the battery case 5, it may be necessary to form the wall surface 525B and the front surfaces of the other overhang portion using a mold from the side of the battery mounting surface 51, and thus it is not possible to form the regulating portion 525 and the other overhang portion such that they are aligned in the front-rear direction. In this case, it is necessary to provide the other overhang portion in a position that is displaced from the regulating portion 525 in the left-right direction. In this case, the overhang portion 25 is not positioned on the first direction side (to the rear) of the center position, in the left-right direction, of the negative electrode terminal 582. Therefore, there may be a case in which it is not possible to use the other overhang portion to inhibit the positive electrode 891 and the negative electrode 892 of the battery 89 from being connected in reverse. In order to prevent the reverse connection of the battery 89, it may be necessary to form the regulating portion 525 and the other overhang portion within a range that is narrower than the width of the battery 89 in the left-right direction. Thus, the space in which the other overhang portion is formed is limited, and it is possible that the other overhang portion having sufficient strength cannot be formed. As a result, the other overhang portion may be snapped or may be bent. The case in which the regulating portion 525 and the other overhang portion are formed on the battery case 5 is explained above, and the above also applies to a case in which not the regulating portion 525 but a member having another shape that is configured to support the negative electrode terminal 582 or to regulate the movement of the negative electrode terminal 582 and the other overhang portion are formed on the battery case 5.

In the present embodiment, the overhang portion 25 is formed as a separate body from the battery case 5 and thus the regulating portion 525 and the overhang portion 25 can be arranged such that they are aligned in the front-rear direction (refer to FIG. 8). As a result, each of the overhang portions 25 is positioned on the first direction side with respect to the contact portion 583 of each of the negative electrode terminals 582. It is therefore possible, using the overhang portion 25, to reliably inhibit the positive electrode 891 and the negative electrode 892 of the battery 89 from being connected in reverse. In addition, as the overhang portion 25 is formed as a separate body from the battery case 5, there is no restriction on the space to form the overhang portion 25 and it is possible to freely specify the shape of the overhang portion 25. Thus, it is possible to form the overhang portion 25 having sufficient strength. As a result, it is possible to reduce the possibility of the overhang portion 25 being snapped or bent.

As shown in FIG. 8, the first overhang portion 251 includes the first wall portion 251A and the second wall portion 251B. When the battery 89 is disposed in the battery case 5 in a state in which the positive electrode 891 and the negative electrode 892 of the battery 89 are in a reversed state, the battery 89 moves in a direction that is opposite to the first direction (to the front). At that time, the battery 89 may come into contact with the second wall portion 251B of the first overhang portion 251. The first wall portion 251A of the first overhang portion 251 extends to the first direction side, and thus the first wall portion 251A has sufficient strength with respect to a force that is applied in the first direction and in the direction opposite to the first direction. As a result, when the battery 89 comes into contact with the second wall portion 251B, the first wall portion 251A can support the second wall portion 251B. Therefore, compared to a case in which the first wall portion 251A is not provided, the strength of the first overhang portion 251 is increased and it is possible to reliably inhibit the positive electrode 891 and the negative electrode 892 of the battery 89 from being connected in reverse.

The first wall portion 251A of the first overhang portion 251 is inserted into the slit 526. The positioning of the top cover 201 and the battery case 5 can be determined in this manner. Thus, at the time of manufacture of the tape printer 1, operation efficiency to connect the top cover 201 and the battery case 5 is improved.

The overhang portion 25 is positioned in the vicinity of the end portion of the negative electrode terminal 582 on the first direction side. As a result, the overhang portion 25 can inhibit the negative electrode terminal 582 from slipping out on the first direction side.

Various modifications are possible in relation to the above-described embodiment. For example, the slit 526 is formed in the peripheral wall portion 52 and the first wall portion 251A of the first overhang portion 251 is inserted into the slit 526 in the above-described embodiment. However, an opening that corresponds to the shape of the entire first overhang portion 251 may be provided in the peripheral wall portion 52, for example, and the entire first overhang portion 251 may be inserted into the opening such that the first overhang portion 251 protrudes to the inner side of the peripheral wall portion 52. Similarly, an opening that corresponds to the shape of the second overhang portion 252 may be provided in the peripheral wall portion 52, and the second overhang portion 252 may be inserted into the opening such that the second overhang portion 252 protrudes to the inner side of the peripheral wall portion 52. Further, the slit 526 need not necessarily be provided in the peripheral wall portion 52. In this case, the first overhang portion 251 need not necessarily be inserted into the slit 526. Further, the first overhang portion 251 need not necessarily include the first wall portion 251A.

It is sufficient if the overhang portion 25 is provided on a member that is separate from a member that includes a storage portion for a battery. For example, the overhang portion 25 may be provided on a member having a function that is different to the functions relating to the storage of the battery 89. Thus, the overhang portion 25 may be provided on a member other than the top cover 201 and the bottom cover 202. For example, the overhang portion 25 may be contiguous with a member that supports an electrical board (not shown in the drawings) of the tape printer 1.

The battery storage structure exemplified in the above-described embodiment need not necessarily be provided on the tape printer 1 and may be provided on various other types of member or device that can store a battery. For example, the battery storage structure exemplified in the above-described embodiment may be provided on a battery storage member that is configured to be externally attached to a mobile device and to supply power to the mobile device. In this case, for example, the battery storage member may include a battery case and an exterior cover that is provided with the overhang portion. The overhang portion 25 may be arranged on the first direction side of the positive electrode terminal 581 and not on the first direction side of the negative electrode terminal 582.

Figure 10:
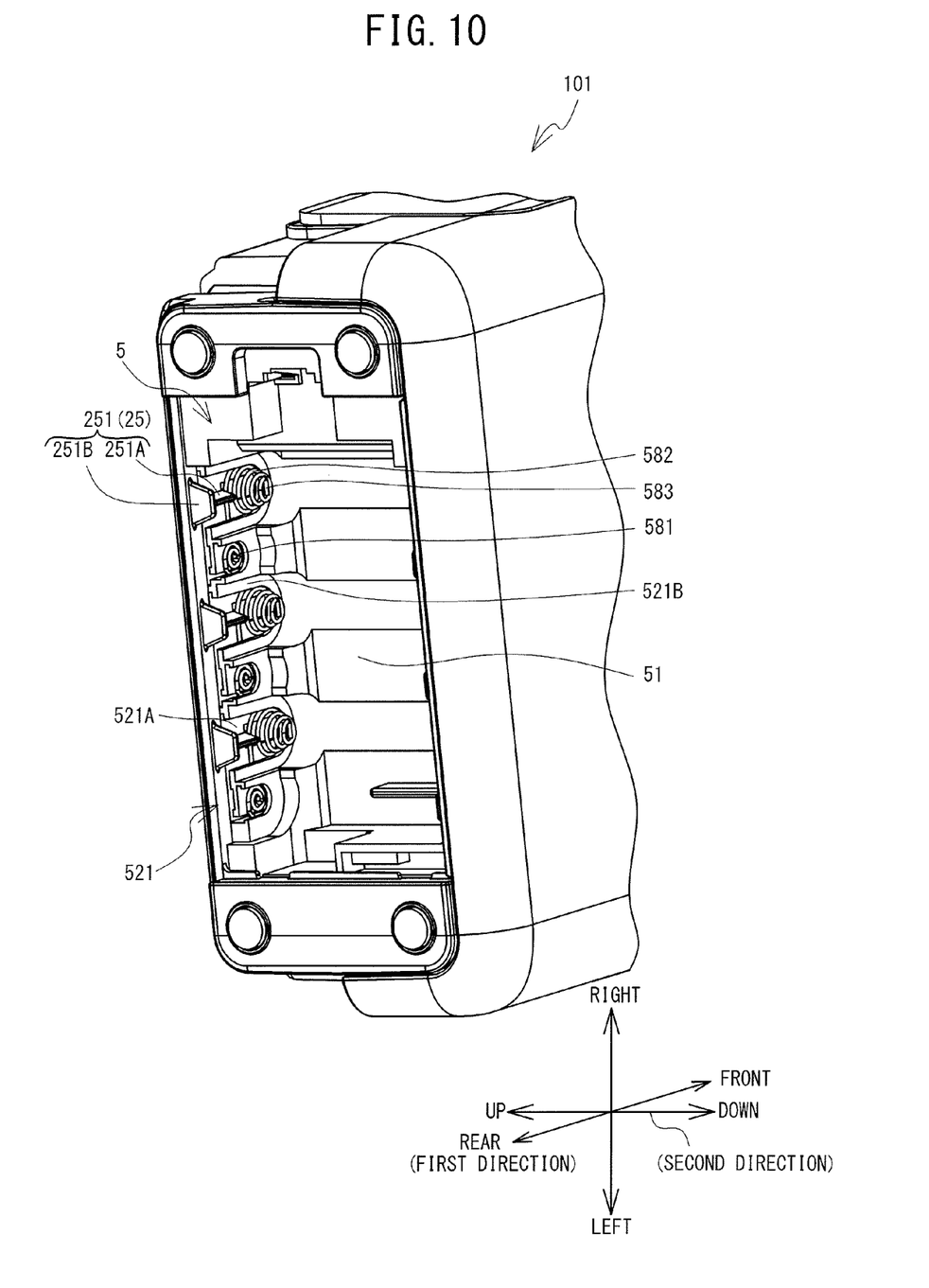
FIG. 10 is a perspective view of the structure surrounding the battery case of the tape printer according to a modified example.

The overhang portion 25 need not necessarily be arranged in the position in the vicinity of the end portion of the negative electrode terminal 582 on the first direction side. The overhang portion 25 and the negative electrode terminal 582 may be further apart than in the above-described embodiment. The overhang portion 25 may be in contact with the end portion of the negative electrode terminal 582 on the first direction side. In a tape printer 101 according to a modified example shown in FIG. 10, in contrast to the tape printer 1 shown in FIG. 8, the regulating portions 525 are not provided. In addition, the front end of each of the first wall portions 251A of the first overhang portions 251 is in contact with the rear end that is the end portion of each of the negative electrode terminals 582 on the first direction side. Although not shown in the drawings, the front end of each of the second overhang portions 252 may also be in contact with the rear end of each of the negative electrode terminals 582. In these cases also, the first overhang portion 251 and the second overhang portion 252 can inhibit the negative electrode terminal 582 from slipping out on the first direction side. Further, in the tape printer 101, as the regulating portions 525 are not provided, the hole portions are not formed in the battery mounting surface 51 in order to arrange the mold to form the wall surfaces 525B of the regulating portions 525. As a result, if liquid seeps into the battery case 5, or if the battery 89 leaks, it is possible to reliably inhibit the liquid from passing through the hole portions to form the wall surfaces 525B and leaking into parts other than the battery case 5. It is possible to omit a mold structure to form parts for fixing the negative electrode terminals 582 to the battery case 5, such as the regulating portions 525 etc., and thus the mold can be simplified.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A battery storage structure comprising:
  a battery storage portion configured to store a battery, the battery storage portion including a bottom surface portion and peripheral wall portion, the peripheral wall portion extending from the perimeter of the bottom surface portion in a direction that intersects with the bottom surface portion and forming a first opening that is opposed to the bottom surface portion;

a battery terminal that is supported by the peripheral wall portion, the battery terminal protruding from the peripheral wall portion toward an inner side of the battery storage portion, the battery terminal having a contact portion that is configured to make contact with an electrode of the battery when the battery is stored in the battery storage portion, the contact portion being a portion that includes a protruding end of the battery terminal;

a separate member that is formed as a separate body from the battery storage portion, the separate member being provided on an opposite side of the battery storage portion from the peripheral wall portion; and an overhang portion that is provided on the separate member, the overhang portion being positioned on a side in a first direction with respect to the contact portion and protruding from the separate member in a second direction, the first direction being a direction from the bottom surface portion toward the first opening, the second direction being a direction that penetrates the peripheral wall portion when viewed in the first direction and being a direction that intersects the first direction, wherein the contact portion protrudes from the peripheral wall portion in a direction parallel to the second direction, the battery storage portion stores the battery such that the battery extends in a direction parallel to the second direction from the contact portion that makes contact with the electrode of the battery, and the overhang portion overlaps with the battery terminal when viewed in the first direction.

2. The battery storage structure according to claim 1, wherein the separate member has a function that is different than a function relating to storage of the battery.

3. The battery storage structure according to claim 1, wherein the second direction is a direction that is orthogonal to the first direction.

4. The battery storage structure according to claim 1, wherein the overhang portion includes a first wall portion and a second wall portion, the first wall portion extending in the first direction and the second wall portion extending from an end portion on the first direction side of the first wall portion in a direction that intersects with the first wall portion.

5. The battery storage structure according to claim 4, wherein the second wall portion extends from the end portion on the first direction side of the first wall portion in a direction that is orthogonal to the first wall portion.

6. The battery storage structure according to claim 1, wherein the peripheral wall portion includes a second opening that penetrates the peripheral wall portion at the first direction side of the battery terminal, the second opening penetrating the peripheral wall portion in a direction parallel to the second direction, and the overhang portion is inserted into the second opening from an outer side of the peripheral wall portion and protrudes to the inner side of the peripheral wall portion.

7. The battery storage structure according to claim 1, wherein the overhang portion is disposed in a position where the overhang portion is in contact with an end portion of the battery terminal on the first direction side.

8. The battery storage structure according to claim 1, wherein the separate member is a member having a cassette housing portion, the cassette housing portion being an area configured to removably house a tape cassette, the tape cassette storing a tape that is a print medium.

9. The battery storage structure according to claim 1, wherein the separate member is a member that forms at least a part of an exterior wall of a device.

* * * * *